(12) United States Patent
Hicks et al.

(10) Patent No.: US 12,129,794 B2
(45) Date of Patent: Oct. 29, 2024

(54) VANE ASSEMBLY FOR A GAS TURBINE ENGINE

(71) Applicant: ROLLS-ROYCE plc, London (GB)

(72) Inventors: Robert W. Hicks, Derby (GB); Nicholas E. Chilton, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/062,721

(22) Filed: Dec. 7, 2022

(65) Prior Publication Data

US 2023/0184165 A1 Jun. 15, 2023

(30) Foreign Application Priority Data

Dec. 10, 2021 (GB) ..................................... 2117857

(51) Int. Cl.
*F02C 7/047* (2006.01)
*F01D 25/02* (2006.01)

(52) U.S. Cl.
CPC .............. *F02C 7/047* (2013.01); *F01D 25/02* (2013.01)

(58) Field of Classification Search
CPC . F02C 7/047; F01D 25/02; F01D 9/06; F01D 9/065
See application file for complete search history.

(56) References Cited

U.S. PATENT DOCUMENTS

| | | |
|---|---|---|
| 3,807,892 A | 4/1974 | Frei et al. |
| 6,508,620 B2 * | 1/2003 | Sreekanth ............... F01D 5/187 415/115 |
| 10,337,340 B2 * | 7/2019 | Cortequisse .......... F01D 25/246 |
| 2016/0061056 A1 | 3/2016 | Appukuttan et al. |
| 2016/0222806 A1 * | 8/2016 | Jennings ................. F01D 5/284 |
| 2017/0107906 A1 | 4/2017 | Oggero et al. |
| 2018/0066536 A1 | 3/2018 | Scholtes et al. |
| 2018/0066537 A1 | 3/2018 | Radomski et al. |

FOREIGN PATENT DOCUMENTS

WO 02092970 A1 11/2002

OTHER PUBLICATIONS

European search report dated May 5, 2023, issued in EP Patent Application No. 22207391.8.
Great Britain search report dated Apr. 28, 2022, issued in GB Patent Application No. 2117857.9.

* cited by examiner

*Primary Examiner* — Steven M Sutherland
(74) *Attorney, Agent, or Firm* — Oliff PLC

(57) ABSTRACT

A vane assembly for a gas turbine engine which is a single unitary component that includes an aerofoil. A leading edge passageway is disposed proximal to a leading edge of the aerofoil and configured to receive a flow of a fluid therein. The vane assembly further includes a connecting passageway fluidly communicating the leading edge passageway with a trailing edge distribution passageway that is spaced apart from the leading edge, the leading edge passageway and a trailing edge of the aerofoil. The vane assembly further includes a plurality of trailing edge passageways disposed proximal to a pressure surface of the aerofoil and extending from the trailing edge distribution passageway towards the trailing edge along a chordwise direction. Each trailing edge passageway is configured to discharge the fluid through a corresponding passageway outlet disposed on the pressure surface and in fluid communication with a corresponding trailing edge passageway.

19 Claims, 10 Drawing Sheets

VANE ASSEMBLY FOR A GAS TURBINE ENGINE

CROSS-REFERENCE TO RELATED APPLICATIONS

This specification is based upon and claims the benefit of priority from United Kingdom patent application number GB 2117857.9 filed on Dec. 10, 2021, the entire contents of which is incorporated herein by reference.

BACKGROUND

Technical Field

The present disclosure generally relates to a vane assembly, and in particular to a vane assembly for a gas turbine engine.

Description of the Related Art

Compressors of gas turbine engines typically include alternating rotors and stators, which compress air in use. A first stator (or "stator vane") provided at an inlet to a core of the gas turbine engine, downstream of an intake fan, is termed as "Engine Section Stator" (ESS) or "core inlet stator". ESS vanes guide air flow entering the core of the gas turbine engine.

Generally, ESS vanes are prone to ice build-up due to low temperatures sometimes experienced during operation of the gas turbine engine, particularly at leading edges of the ESS vanes. Such ice build-up may reduce aerodynamic performance of the ESS vane, and/or may cause damage to downstream components (e.g., rotors of compressors) of the gas turbine engine when pieces of ice break off from the ESS vane upon accumulation and enter the core of the gas turbine engine.

Consequently, gas turbine engines typically include de-icing systems that may heat external aerofoil surfaces of the ESS vane to a temperature at which ice may not form or accumulate to such an extent that presents a noticeable blockage to the air flow or may damage the downstream components of the gas turbine engine if ice is shed from the ESS vane.

Some de-icing systems typically include electrical heaters located within the ESS vane that are used to heat the ESS vane. Some de-icing systems use engine bleed air from the compressor to be fed through the ESS vane, and hence, heat the ESS vane. Conventional ESS vanes typically include a single internal passageway running behind the leading edge of the aerofoil that receives the bleed air. Most of this bleed air is exhausted via metering holes disposed at the sides of the aerofoil near a trailing edge of the aerofoil. A series of long, straight, narrow passages run from a rear side of the single internal passageway rearwards before exhausting the bleed air through the metering holes. These passages are used to distribute heat to a pressure side of the aerofoil.

Such passages are long and have a small diameter, and hence, are typically manufactured using electro-discharge machining (EDM). EDM requires the passages to be straight and as the passages extend rearward through the curved aerofoil, a large wall thickness is disposed between the passages and the pressure surface along most of their length. To get close to the pressure surface along some of their length, the metering holes of the passages end up on a suction surface of the aerofoil. This may cause undesirable aerodynamic losses since the exhausted air separates from the suction surface due to the shape of the aerofoil. Further, the passages may fluidly communicate directly with the single internal passageway. This may reduce heating of the leading edge from the bleed air passing through the single internal passageway since a portion of the bleed air flows to the passages before heating the leading edge.

SUMMARY

According to a first aspect there is provided a vane assembly for a gas turbine engine. The vane assembly is a single unitary component that includes an aerofoil including a radially inner end, a radially outer end, a leading edge, a trailing edge, a pressure surface extending between the leading edge and the trailing edge, and a suction surface opposing the pressure surface and extending between the leading edge and the trailing edge. The aerofoil defines a spanwise direction between the radially inner end and the radially outer end. The aerofoil further defines a chordwise direction between the leading edge and the trailing edge. The vane assembly further includes a leading edge passageway disposed at least partially within the aerofoil proximal to the leading edge and extending at least along the spanwise direction of the aerofoil. The leading edge passageway is configured to receive a flow of a fluid therein proximal to the radially outer end of the aerofoil. The vane assembly further includes a trailing edge distribution passageway disposed at least partially within the aerofoil and extending at least along the spanwise direction of the aerofoil. The trailing edge distribution passageway is spaced apart from the leading edge, the leading edge passageway and the trailing edge, such that the leading edge passageway is disposed between the leading edge and the trailing edge distribution passageway with respect to the chordwise direction of the aerofoil. The vane assembly further includes a connecting passageway disposed at least partially within the aerofoil proximal to the radially inner end and fluidly communicating the leading edge passageway with the trailing edge distribution passageway. The vane assembly further includes a plurality of trailing edge passageways disposed within the aerofoil and spaced apart from each other with respect to the spanwise direction of the aerofoil. Each of the plurality of trailing edge passageways is disposed in fluid communication with the trailing edge distribution passageway and extends from the trailing edge distribution passageway towards the trailing edge at least along the chordwise direction. Each of the plurality of trailing edge passageways is disposed proximal to the pressure surface. The vane assembly further includes a plurality of passageway outlets disposed on the pressure surface proximal to the trailing edge. Each of the plurality of passageway outlets is disposed in fluid communication with a corresponding trailing edge passageway from the plurality of trailing edge passageways. Each of the plurality trailing edge passageways is configured to discharge the fluid through a corresponding passageway outlet from the plurality of passageways outlets.

The vane assembly of the present disclosure may allow the fluid to first flow through the leading edge passageway and then through the plurality of trailing edge passageways. Specifically, the fluid first flows through the leading edge passageway and then is received within the trailing edge distribution passageway. The trailing edge distribution passageway distributes the fluid among the plurality of trailing edge passageways. The fluid may therefore heat the leading edge first before being distributed among the plurality of trailing edge passageways. This may allow substantial heating of the leading edge through the leading edge passageway before the fluid flows through other passages to heat other surfaces of the aerofoil (i.e., the pressure surface). Thus, the vane assembly of the present disclosure may distribute heat more effectively to the desired portions of the aerofoil. Flow of the fluid through the plurality of trailing edge passageways may also heat the pressure surface of the aerofoil effectively since the plurality of trailing edge passageways are disposed proximal to the pressure surface. In the above configuration of the vane assembly, the fluid may first heat the leading edge of the aerofoil and then the other surfaces of the aerofoil (i.e., the pressure surface).

Additionally, discharge of the fluid through the plurality of passageways outlets that are disposed on the pressure surface of the aerofoil may minimise or eliminate aerodynamic losses that would otherwise have occurred when the fluid is discharged through the suction surface of the aerofoil. Thus, the vane assembly of the present disclosure may distribute heat from the fluid to both the leading edge and the pressure side, thereby maximising heating potential of the fluid, whilst exhausting the fluid through the pressure surface of the aerofoil, thereby minimising aerodynamic losses.

In some embodiments, a spanwise shape of the leading edge passageway along the spanwise direction is similar to a spanwise shape of the leading edge along the spanwise direction. This may allow the leading edge passageway to follow a shape and contour of the leading edge, thereby increasing a portion of the leading edge heated by the fluid flowing through the leading edge passageway and enabling effective heating of the leading edge. Further, this may allow a given flow-rate of the fluid to cover a greater portion of the leading edge, or alternatively, use less fluid to achieve the same heating effect, thereby increasing a fuel efficiency of the gas turbine engine.

In some embodiments, a shape of each of the plurality of trailing edge passageways is similar to a shape of the pressure surface at a corresponding span of the aerofoil. This may allow the plurality of trailing edge passageways to follow the shape and contours of the pressure surface, thereby increasing a portion of the pressure surface heated by the fluid flowing through the plurality of trailing edge passageways and enabling effective heating of the pressure surface. Further, this may allow a given flow-rate of the fluid to cover a greater portion of the pressure surface, or alternatively, use less fluid to achieve the same heating effect, thereby increasing the fuel efficiency of the gas turbine engine.

In some embodiments, the vane assembly further includes an inner annulus wall coupled to the radially inner end of the aerofoil. In some embodiments, the vane assembly further includes an outer annulus wall coupled to the radially outer end of the aerofoil. The inner annulus wall and the outer annulus wall of multiple vane assemblies may be coupled together to form a ring (e.g., engine section stator).

In some embodiments, the leading edge passageway extends from the outer annulus wall to the inner annulus wall via the aerofoil. Thus, the leading edge passageway may extend throughout the length of the leading edge between the outer annulus wall and the inner annulus wall.

In some embodiments, the leading edge passageway includes a first leading opening extending through the outer annulus wall and a second leading opening extending through the inner annulus wall. The leading edge passageway extends from the first leading opening to the second leading opening. The first leading opening is configured to receive flow of the fluid therein.

In some embodiments, the vane assembly further includes a first closure plate coupled to the inner annulus wall and closing the second leading opening of the leading edge passageway. Thus, the leading edge passageway is closed at one end of the leading edge passageway (i.e., the second leading opening), thereby allowing the fluid to flow within the connecting passageway fluidly communicating with the leading edge passageway.

In some embodiments, the connecting passageway fluidly communicates with the leading edge passageway within the aerofoil proximal to the inner annulus wall. Thus, the fluid may flow through an entire extent of the leading edge passageway before being received within the connecting passageway. Therefore, the fluid may be used to first heat the leading edge of the aerofoil before heating other surfaces of the aerofoil.

In some embodiments, the trailing edge distribution passageway extends from the inner annulus wall to the outer annulus wall via the aerofoil. Thus, the trailing edge distribution passageway extends along the entire length of the aerofoil in the spanwise direction.

In some embodiments, the trailing edge distribution passageway includes a first trailing opening extending through the inner annulus wall and a second trailing opening extending through the outer annulus wall. The trailing edge distribution passageway extends from the first trailing opening to the second trailing opening. The first trailing opening may allow the fluid to be received within the trailing edge distribution passageway from the connecting passageway.

In some embodiments, the vane assembly further includes a second closure plate coupled to the inner annulus wall and closing the first trailing opening of the trailing edge distribution passageway. In some embodiments, the vane assembly further includes a third closure plate coupled to the outer annulus wall and closing the second trailing opening of the trailing edge distribution passageway. The second closure may cover the first trailing opening at the inner annulus wall, thereby allowing the fluid to be received within the trailing edge distribution passageway from the connecting passageway through the inner annulus wall. Further, the fluid flowing through the trailing edge distribution passageway may flow within the trailing edge passageways since second trailing opening of the trailing edge distribution passageway is closed by the third closure plate.

In some embodiments, the connecting passageway fluidly communicates with the trailing edge distribution passageway within the inner annulus wall. Thus, the connecting passageway may allow the fluid to flow within the trailing edge distribution passageway through the inner annulus wall.

In some embodiments, the passageway outlet has a polygonal shape.

In some embodiments, the aerofoil further includes a hollow cavity extending at least in the spanwise direction and fluidly isolated from the leading edge passageway, the trailing edge distribution passageway, the plurality of trailing edge passageways, and the connecting passageway. The hollow cavity may be utilized for transferring wires, coolant ducts, and/or bearing chamber services (air flow, oil flow, electrical wiring, etc.) through the aerofoil, and may reduce an overall weight of the vane assembly.

The vane assembly is a single unitary component, i.e. it is a one piece, homogenous or monolithic component that is integrally manufactured, for example using additive layer manufacturing. ALM may enable manufacturing of complex passages that are closer to the surfaces (i.e., the pressure surface) and edges (e.g., the leading edge) of the aerofoil and that follow the contours of the surfaces. This may allow the leading edge passageway and the plurality of trailing edge passageways to be brought closer to the respective edge/ surface of the aerofoil, i.e., the leading edge and the pressure surface, thereby allowing effective heating thereof.

In some embodiments, the vane assembly is an engine section stator vane.

According to a second aspect, there is provided a gas turbine engine including the vane assembly of the first aspect.

According to a third aspect, there is provided a de-icing system for a gas turbine engine. The de-icing system includes a source of bleed air. The de-icing system further includes the vane assembly of the first aspect. The leading edge passageway of the vane assembly is disposed in fluid communication with the source of bleed air and configured to receive bleed air from the source of bleed air. The de-icing system may supply bleed air from the source of bleed air to the leading edge passageway, thereby heating the vane assembly. Thus, the de-icing system may mitigate or eliminate ice build-up on the vane assembly.

In some embodiments, the source of bleed air is a compressor of the gas turbine engine.

According to a fourth aspect, there is provided a gas turbine engine including the de-icing system of the third aspect.

According to a fifth aspect, there is provided a method of de-icing a vane assembly of a gas turbine engine. The method includes providing a vane assembly. The vane assembly includes an aerofoil comprising a radially inner end, a radially outer end, a leading edge, a trailing edge, a pressure surface extending between the leading edge and the trailing edge, and a suction surface opposing the pressure surface and extending between the leading edge and the trailing edge. The method further includes receiving a flow of a fluid through a leading edge passageway proximal to the radially outer end of the aerofoil. The leading edge passageway is disposed at least partially within the aerofoil and extending at least along a spanwise direction of the aerofoil. The method further includes receiving the fluid flowing through the leading edge passageway within a connecting passageway fluidly communicating with the leading edge passageway and disposed at least partially within the aerofoil proximal to the radially inner end. The method further includes receiving the fluid flowing through the connecting passageway within a trailing edge distribution passageway fluidly communicating with the connecting passageway and disposed at least partially within the aerofoil and extending at least along the spanwise direction of the aerofoil. The trailing edge distribution passageway is spaced apart from the leading edge, the leading edge passageway and the trailing edge, such that the leading edge passageway is disposed between the leading edge and the trailing edge distribution passageway with respect to a chordwise direction of the aerofoil. The method further includes receiving at least a portion of the fluid flowing through the trailing edge distribution passageway within a plurality of trailing edge passageways fluidly communicating with the trailing edge distribution passageway and disposed within the aerofoil. The plurality of trailing edge passageways is spaced apart from each other with respect to the spanwise direction of the aerofoil. Each of the plurality of trailing edge passageways extends from the trailing edge distribution passageway towards the trailing edge at least along the chordwise direction. Each of the plurality trailing edge passageways is disposed proximal to the pressure surface. The method further includes discharging the fluid flowing through the plurality of trailing edge passageways through a corresponding plurality of passageway outlets disposed on the pressure surface proximal to the trailing edge. Each of the plurality of passageway outlets is disposed in fluid communication with a corresponding trailing edge passageway from the plurality of trailing edge passageways.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example, via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example, one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example, in use) at the lowest rotational speed (for example, the first core shaft in the example above). For example, the gearbox may be arranged to be driven only by the core shaft that is configured to rotate (for example, in use) at the lowest rotational speed (for example, only be the first core shaft, and not the second core shaft, in the example above). Alternatively, the gearbox may be arranged to be driven by any one or more shafts, for example, the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example, multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example, multiple stages. Each stage may comprise a row of rotor blades and a row of stator vanes. The row of rotor blades and the row of stator vanes may be axially offset from each other.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as, an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as, an aluminium lithium alloy) with a titanium leading edge.

A fan as described and/or claimed herein may comprise a central portion, from which the fan blades may extend, for example, in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example, 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
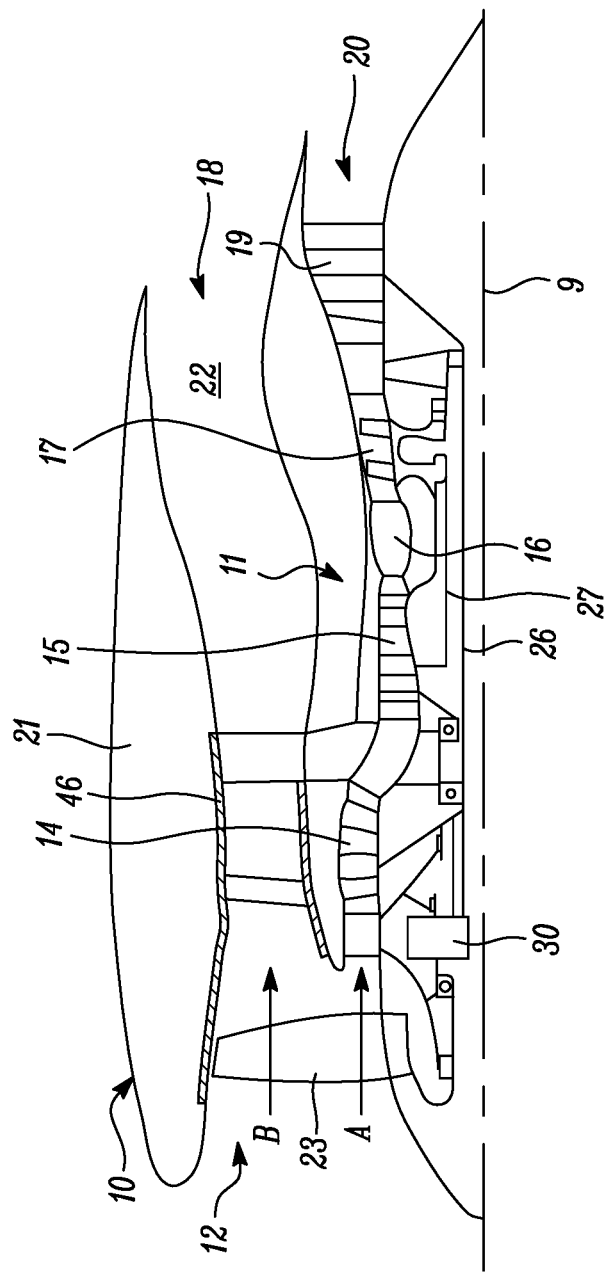
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22, at least a portion of which may be lined with one or more acoustic panels 46 to absorb sound energy and reduce the level of emitted engine noise. The fan 23 is attached to and driven by the low pressure turbine 19 via a shaft 26 and an epicyclic gearbox 30.

In use, the core airflow A is accelerated and compressed by the low pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
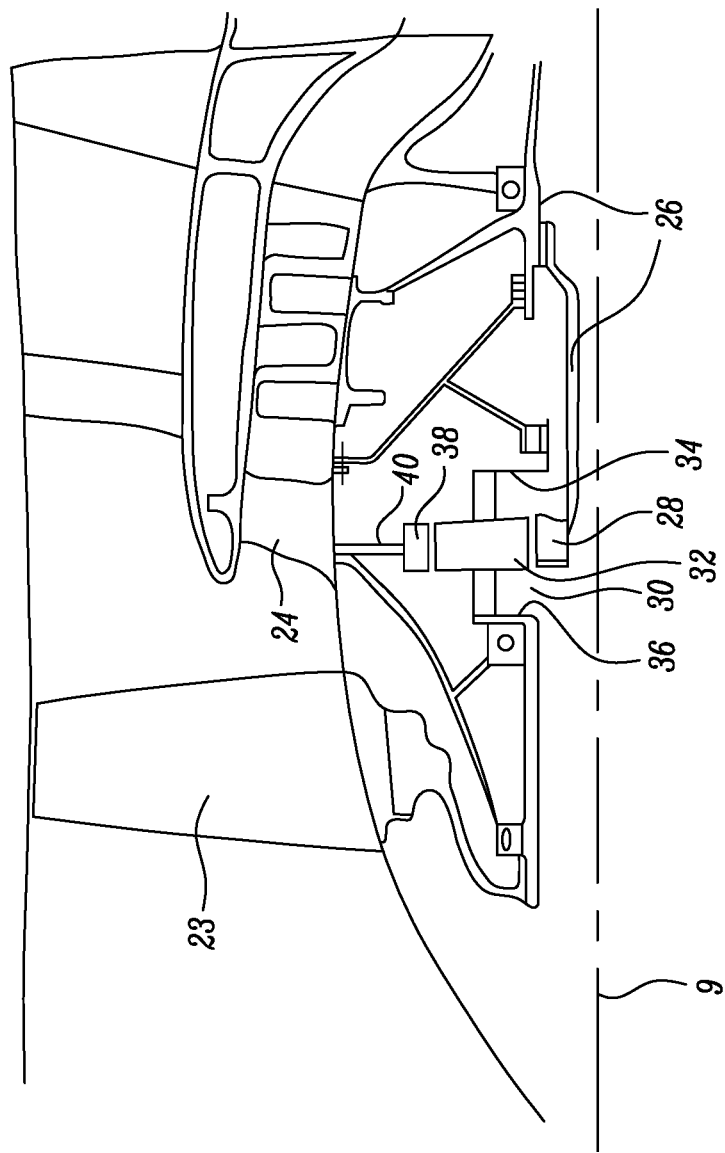
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the rotational axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23), respectively, and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
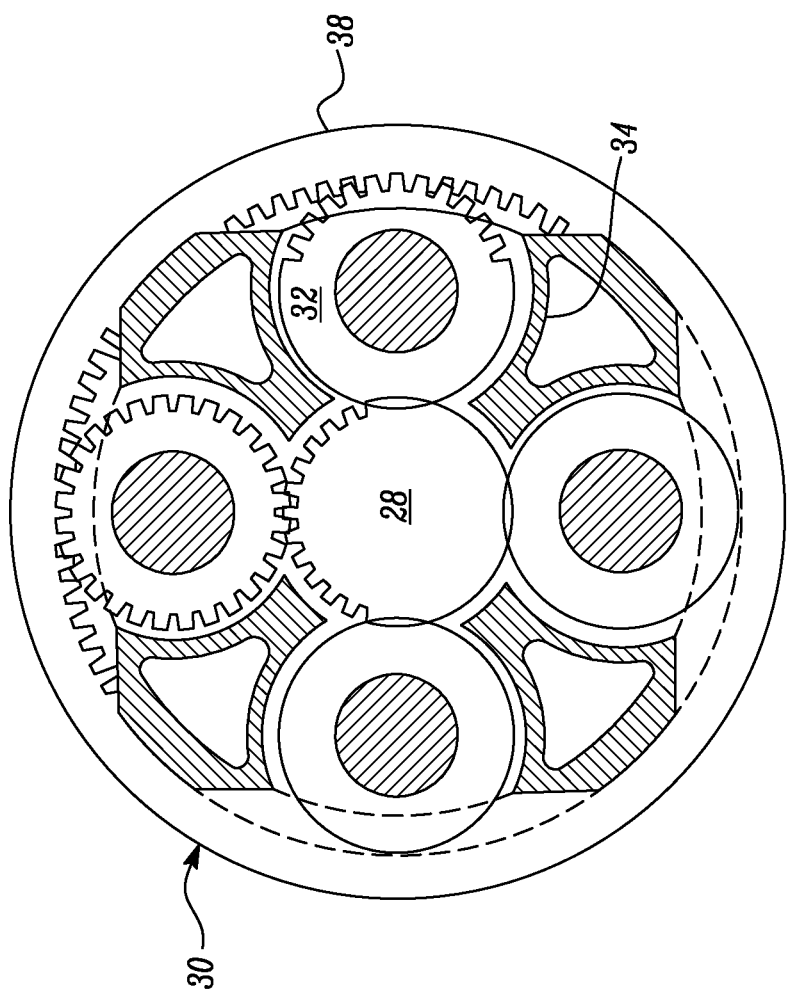
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example, between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example, star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
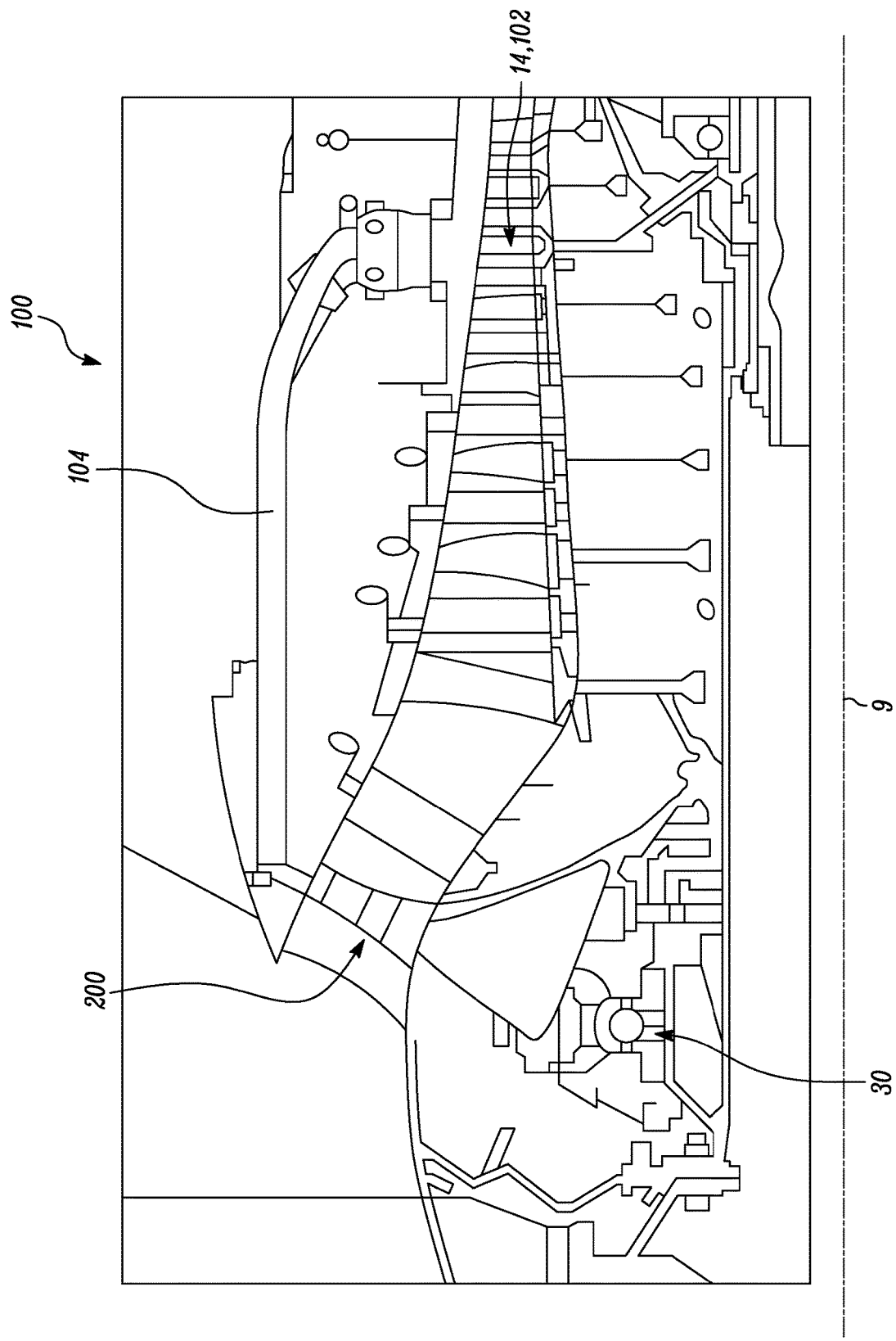
FIG. 4 is a schematic sectional side view of a de-icing system for the gas turbine engine.

FIG. 4 illustrates a schematic view of a de-icing system 100 for a gas turbine engine. In some embodiments, the gas turbine engine 10 (shown in FIG. 1) includes the de-icing system 100. The gas turbine engine 10 is interchangeably referred to hereinafter as the "engine 10".

Referring now to FIGS. 1 and 4, in some embodiments, the low pressure compressor 14 and the high pressure compressor 15 include alternating rotors and stators, which compress the air in use. The low pressure compressor 14 includes a vane assembly 200 (shown in FIG. 4) provided at an inlet to the core 11 and rear of the propulsive fan 23 that guides airflow entering the core 11 of the engine 10. In some embodiments, the engine 10 includes multiple vane assemblies 200 spaced circumferentially around the principal rotational axis 9 at the inlet to the core 11 of the engine 10. In some embodiments, the vane assembly 200 may be referred to as "Engine Section Stator" (ESS) vane or "core inlet stator" vane. In other words, the vane assembly 200 is an engine section stator vane.

In some embodiments, the vane assembly 200 may be prone to ice build-up due to low temperatures sometimes experienced during operation of the engine 10, particularly at a leading edge of the vane assembly 200. In some embodiments, the de-icing system 100 may be utilized to mitigate or eliminate ice build-up on the vane assembly 200.

The de-icing system 100 includes a source of bleed air 102. In some embodiments, the source of bleed air 102 is a compressor (e.g., the low pressure compressor 14) of the engine 10. In some embodiments, bleed air from the source of bleed air 102 may be received in a duct 104 and fed through one or more vane assemblies 200 before vented overboard. In some embodiments, a portion of heat from the bleed air may be transferred to the vane assembly 200, thereby heating the vane assembly 200 and preventing ice from accumulating on external surfaces of the vane assembly 200. It should be understood that the bleed air may be any heated gas and may be taken from any other source within the engine 10, e.g., the high pressure compressor 15, the low pressure turbine 19, the high pressure turbine 17, etc.

In some embodiments, the vane assembly 200 may include internal passages that receive the bleed air from the duct 104 and heat the walls of the vane assembly 200. In some embodiments, the de-icing system 100 may include heat exchangers (not shown) that receive the bleed air from the duct 104 and provide a heated fluid to the vane assembly 200 for heating the vane assembly 200. In some embodiments, the de-icing system 100 may include valves provided with the duct 104 to regulate a mass of the bleed air flowing through the duct 104.

Figure 5:
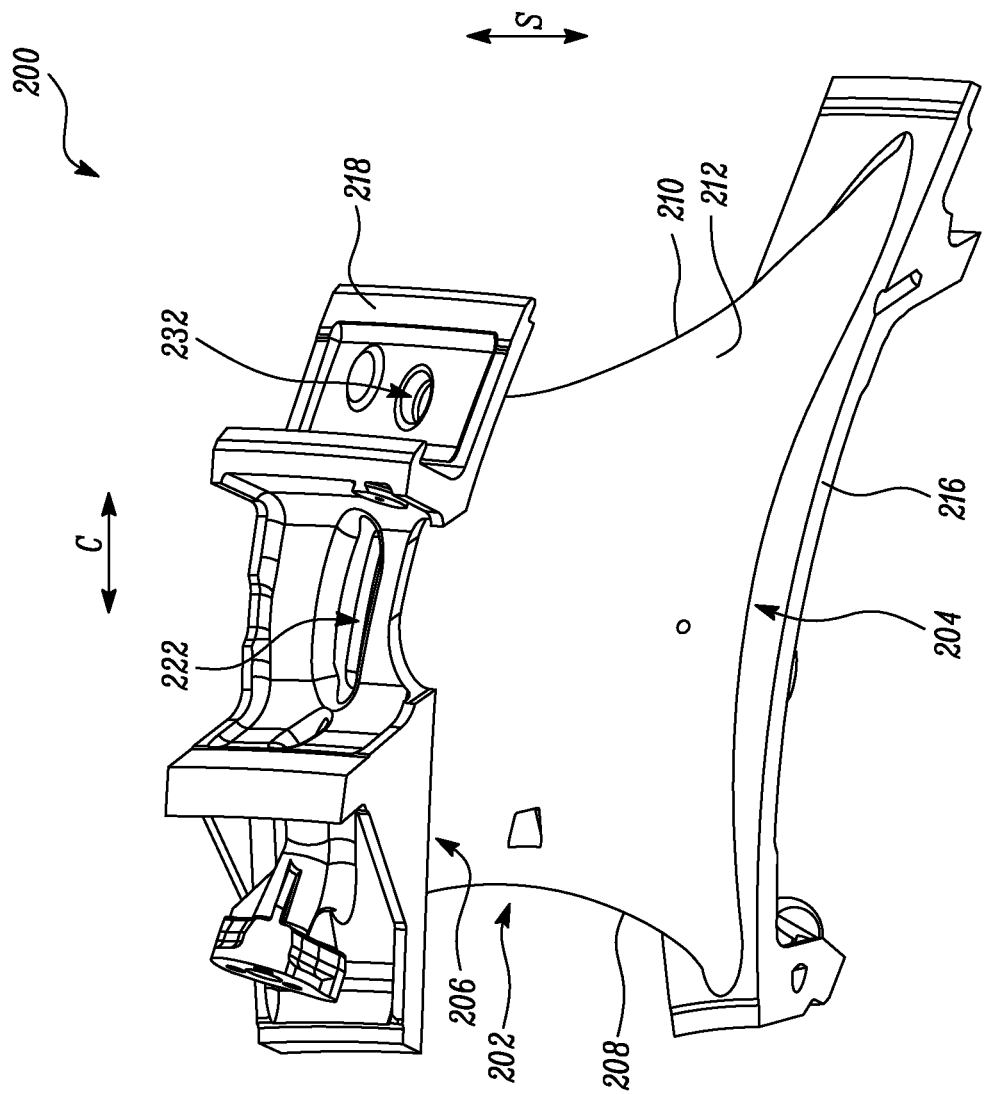
FIG. 5 is a schematic top perspective view of a vane assembly for the gas turbine engine.

Referring now to FIGS. 5-9, the vane assembly 200 of the present disclosure will be described hereinafter in more detail. FIG. 5 illustrates a schematic perspective view of the vane assembly 200 for a gas turbine engine. In some embodiments, the engine 10 (shown in FIG. 1) includes the vane assembly 200.

The vane assembly 200 includes an aerofoil 202. The aerofoil 202 includes a radially inner end 204, a radially outer end 206, a leading edge 210, a trailing edge 208, a pressure surface 212 extending between the leading edge 210 and the trailing edge 208, and a suction surface 214 (shown in FIG. 8) opposing the pressure surface 212 and extending between the leading edge 210 and the trailing edge 208.

The aerofoil 202 defines a spanwise direction S between the radially inner end 204 and the radially outer end 206. The aerofoil 202 further defines a chordwise direction C between the leading edge 210 and the trailing edge 208. In some embodiments, the pressure surface 212 and the suction surface 214 extend a full chordwise extent of the aerofoil 202 along the chordwise direction C.

The vane assembly 200 is a single unitary component. It may be integrally manufactured using additive layer manufacturing (ALM). However, in alternative embodiments, any other manufacturing method may be used based on application requirements. In some embodiments, the aerofoil 202 may be made of a polymeric material (e.g., plastic) and may be formed through plastic injection moulding.

In some embodiments, the vane assembly 200 further includes an inner annulus wall 216 coupled to the radially inner end 204 of the aerofoil 202. In some embodiments, the vane assembly 200 further includes an outer annulus wall 218 coupled to the radially outer end 206 of the aerofoil 202. The inner annulus walls 216 and the outer annulus walls 218 of multiple vane assemblies 200 may be arranged side by side around the principal rotational axis 9 (shown in FIGS. 1 & 4) of the engine 10 to form a ring (e.g., engine section stator).

In some embodiments, the aerofoil 202 further includes a hollow cavity 222 extending at least in the spanwise direction S. In some embodiments, the hollow cavity 222 extends between the inner annulus wall 216 and the outer annulus wall 218 of the vane assembly 200. The hollow cavity 222 may be utilized for transferring wires, coolant ducts, and/or bearing chamber services (air flow, oil flow, electrical wiring, etc.) through the aerofoil, and may reduce an overall weight of the vane assembly 200.

Figure 6:
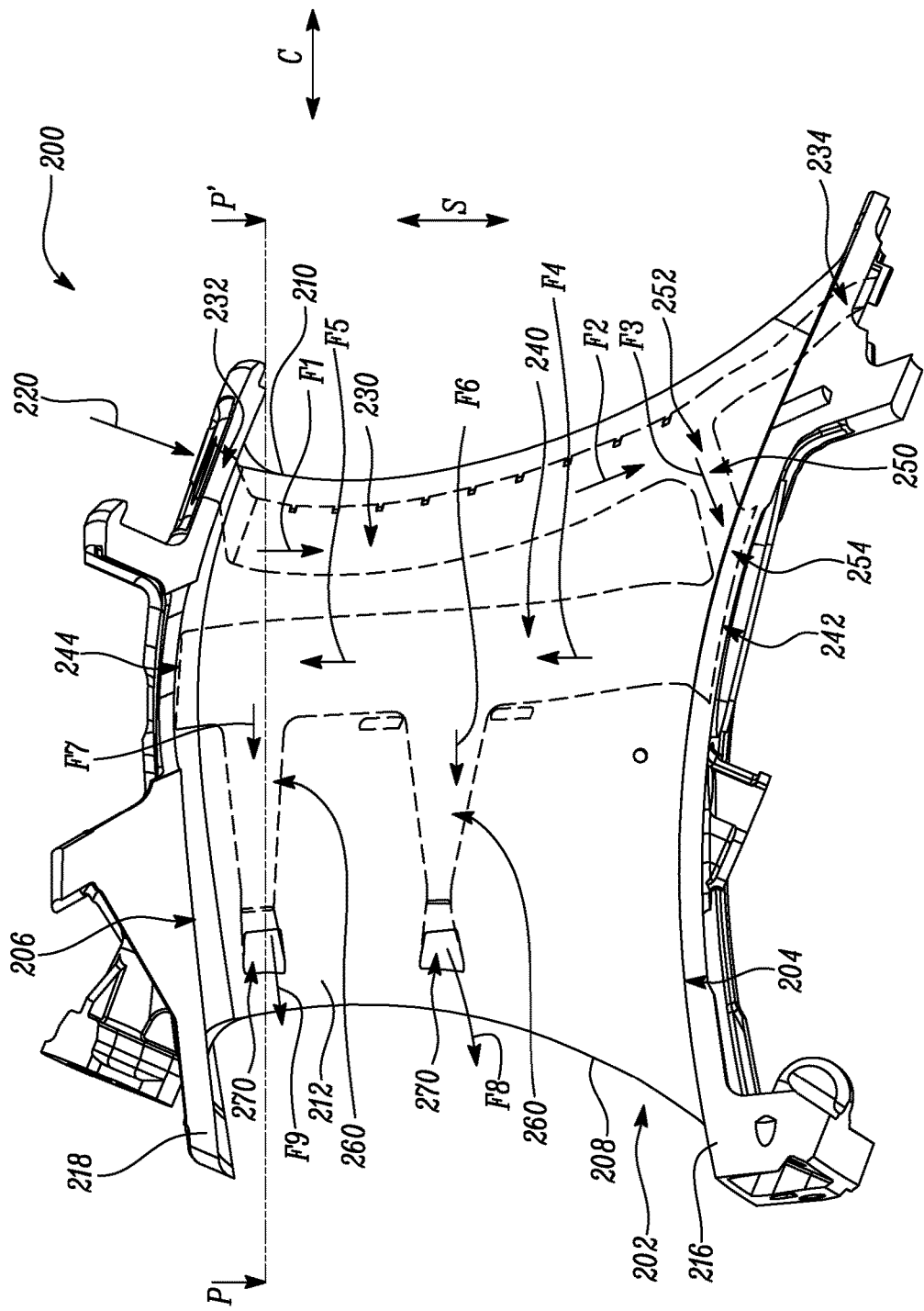
FIG. 6 is a schematic side perspective view of the vane assembly shown in FIG. 5.
Figure 7:
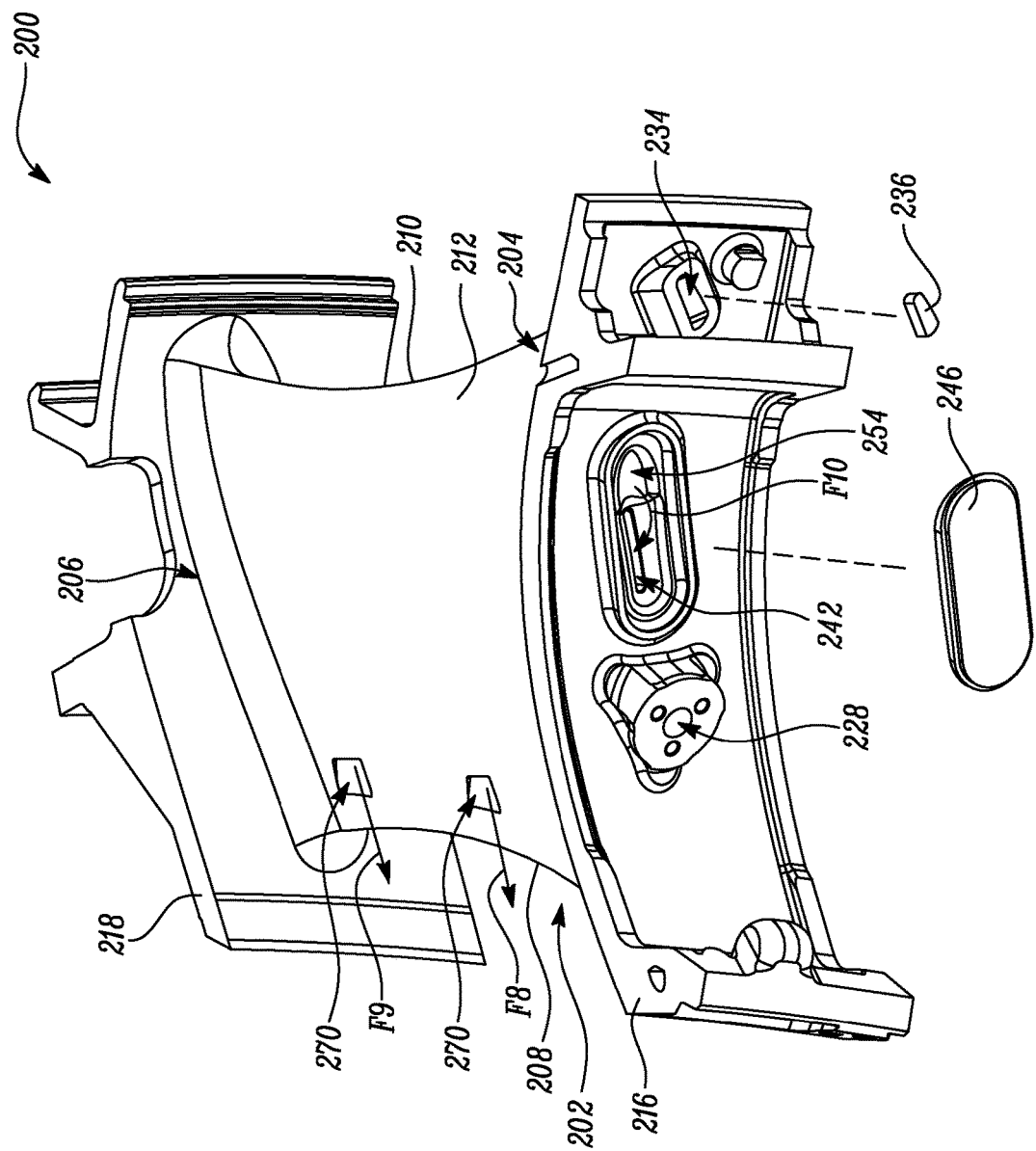
FIG. 7 is a schematic partially exploded bottom perspective view of the vane assembly shown in FIGS. 5 and 6.
Figure 8:
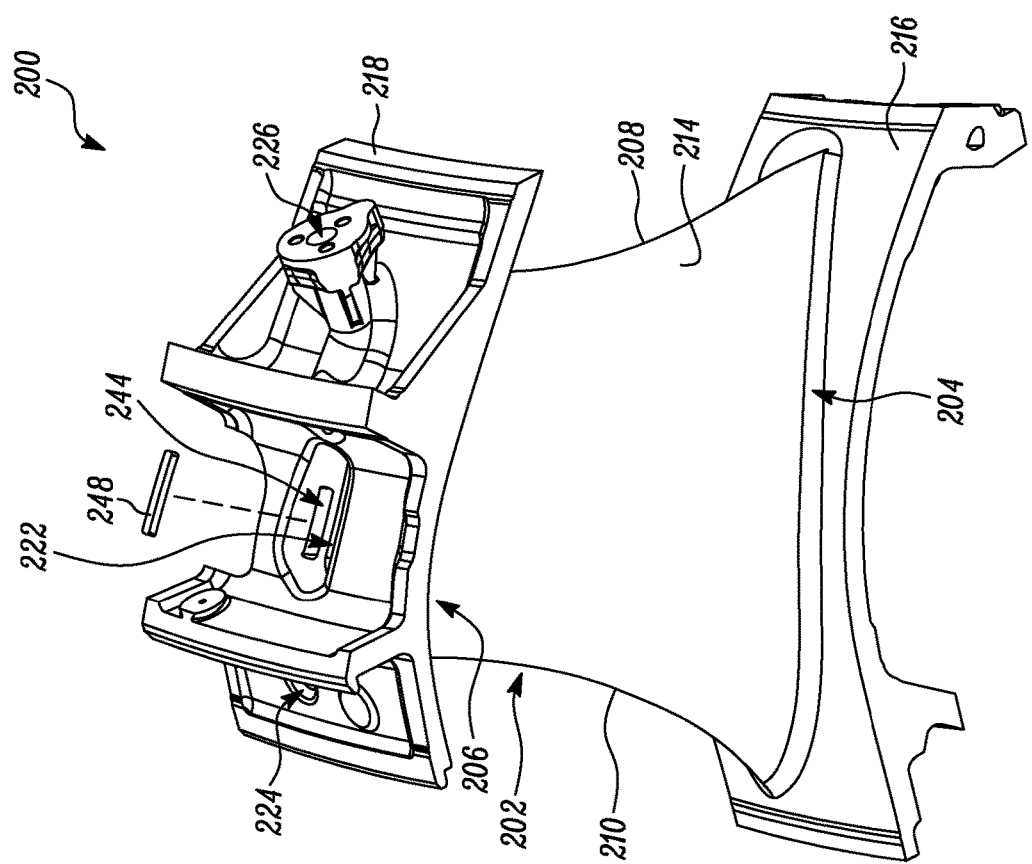
FIG. 8 is a schematic partially exploded top perspective view of the vane assembly shown in FIGS. 5, 6 and 7.

FIG. 6 is a schematic left side view of the vane assembly 200 shown in FIG. 5. FIG. 7 is a schematic bottom view of the aerofoil 202. FIG. 8 is a schematic top view of the aerofoil 202.

Referring now to FIG. 6, internal passages of the vane assembly 200 are shown by dashed lines and will be discussed hereinafter in detail. The internal passages may receive a flow of a fluid 220 (e.g., the bleed air), thereby heating the vane assembly 200 and preventing ice from accumulating on surfaces (e.g., the pressure surface 212) and edges (e.g., the leading edge 210) of the vane assembly 200.

The vane assembly 200 further includes a leading edge passageway 230 disposed at least partially within the aerofoil 202 proximal to the leading edge 210 and extending at least along the spanwise direction S of the aerofoil 202. In some embodiments, the leading edge passageway 230 extends from the outer annulus wall 218 to the inner annulus wall 216 via the aerofoil 202. In some embodiments, a spanwise shape of the leading edge passageway 230 along the spanwise direction S is similar to a spanwise shape of the leading edge 210 along the spanwise direction S. Thus, the leading edge passageway 230 may follow the contours of the leading edge 210 along the spanwise direction S, thereby allowing effective heating of the leading edge 210 through the fluid 220.

Referring now to FIGS. 6 and 7, in some embodiments, the leading edge passageway 230 includes a first leading opening 232 (shown in FIGS. 5 and 6) extending through the outer annulus wall 218 and a second leading opening 234 (shown in FIG. 7) extending through the inner annulus wall 216. The leading edge passageway 230 extends from the first leading opening 232 to the second leading opening 234. In some embodiments, the first leading opening 232 receives the bleed air from the duct 104 (shown in FIG. 4).

The leading edge passageway 230 is configured to receive a flow of the fluid 220 therein proximal to the radially outer end 206 of the aerofoil 202. Specifically, the first leading opening 232 is configured to receive the flow of the fluid 220. In some embodiments, the leading edge passageway 230 is disposed in fluid communication with the source of bleed air 102 (shown in FIG. 4) and configured to receive the bleed air from the source of bleed air 102. In some embodiments, the fluid 220 is the bleed air from the low pressure compressor 14 (shown in FIGS. 1 and 4). However, the fluid 220 may be any heated fluid, e.g., any hot gas.

In some embodiments, the vane assembly 200 further includes a first closure plate 236 (shown in FIG. 7) coupled to the inner annulus wall 216 and closing the second leading opening 234 of the leading edge passageway 230. Thus, the leading edge passageway 230 is closed at one end, i.e., the second leading opening 234 of the leading edge passageway 230.

Referring now to FIGS. 6-8, the vane assembly 200 further includes a trailing edge distribution passageway 240 disposed at least partially within the aerofoil 202 and extending at least along the spanwise direction S of the aerofoil 202. In some embodiments, the trailing edge distribution passageway 240 extends from the inner annulus wall 216 to the outer annulus wall 218 via the aerofoil 202. The trailing edge distribution passageway 240 is spaced apart from the leading edge 210, the leading edge passageway 230 and the trailing edge 208, such that the leading edge passageway 230 is disposed between the leading edge 210 and the trailing edge distribution passageway 230 with respect to the chordwise direction C of the aerofoil 202.

In some embodiments, the trailing edge distribution passageway 240 includes a first trailing opening 242 (shown in FIGS. 6 and 7) extending through the inner annulus wall 216 and a second trailing opening 244 (shown in FIGS. 6 and 8) extending through the outer annulus wall 218. The trailing edge distribution passageway 240 extends from the first trailing opening 242 to the second trailing opening 244.

In some embodiments, the vane assembly 200 further includes a second closure plate 246 (shown in FIG. 7)

coupled to the inner annulus wall 216 and closing the first trailing opening 242 of the trailing edge distribution passageway 240. In some embodiments, the vane assembly 200 further includes a third closure plate 248 (shown in FIG. 8) coupled to the outer annulus wall 218 and closing the second trailing opening 244 of the trailing edge distribution passageway 240. Thus, the trailing edge distribution passageway 240 is closed at both the ends, i.e., the first trailing opening 242 and the second trailing opening 244 of the trailing edge distribution passageway 240.

As shown in FIG. 8, the outer annulus wall 218 further includes an opening 226. A passage (not shown) may extend from the opening 226 and may communicate with the hollow cavity 222 inside the aerofoil 202. In some embodiments, the passage and the hollow cavity 222 may extend from the outer annulus wall 218 to an opening 228 (shown in FIG. 7) extending through the inner annulus wall 216 via the aerofoil 202.

As shown in FIG. 6, the vane assembly 200 further includes a connecting passageway 250 disposed at least partially within the aerofoil 202 proximal to the radially inner end 204 and fluidly communicating the leading edge passageway 230 with the trailing edge distribution passageway 240. In some embodiments, the connecting passageway 250 fluidly communicates with the leading edge passageway 230 within the aerofoil 202 proximal to the inner annulus wall 216. In some other embodiments, the connecting passageway 250 fluidly communicates with the leading edge passageway 230 within the inner annulus wall 216. Further, in some embodiments, the connecting passageway 250 fluidly communicates with the trailing edge distribution passageway 240 within the inner annulus wall 216.

The connecting passageway 250 includes a first connecting end 252 disposed in fluid communication with the leading edge passageway 230 and a second connecting end 254 (also shown in FIG. 7) disposed in fluid communication with the first trailing opening 242 (also shown in FIG. 7) of the trailing edge distribution passageway 240. In some embodiments, the second connecting end 254 may be disposed within the inner annulus wall 216 as shown in FIG. 7.

The vane assembly 200 further includes a plurality of trailing edge passageways 260 disposed within the aerofoil 202 and spaced apart from each other with respect to the spanwise direction S of the aerofoil 202. Each of the plurality of trailing edge passageways 260 is disposed in fluid communication with the trailing edge distribution passageway 240 and extends from the trailing edge distribution passageway 240 towards the trailing edge 208 at least along the chordwise direction C. Each of the plurality of trailing edge passageways 260 is disposed proximal to the pressure surface 212 of the aerofoil 202. In the illustrated embodiment of FIG. 6, two trailing edge passageways 260 are shown from the plurality of trailing edge passageways 260, however, the vane assembly 200 may include any number of trailing edge passageways 260 disposed in fluid communication with the trailing edge distribution passageway 240 based on application requirements.

The vane assembly 200 further includes a plurality of passageway outlets 270 disposed on the pressure surface 212 proximal to the trailing edge 208. Each of the plurality of passageway outlets 270 is disposed in fluid communication with a corresponding trailing edge passageway 260 from the plurality of trailing edge passageways 260.

In some embodiments, the passageway outlet 270 has a polygonal shape (e.g., square, rectangular, etc.). In some embodiments, the plurality of passageway outlets 270 may have an irregular shape. In some other embodiments, some of the plurality of passageway outlets 270 may have a regular shape and other passageway outlets 270 from the plurality of passageway outlets 270 may have an irregular shape. It should be understood that the shape of the plurality of passageway outlets 270 is not limited to only polygonal shape, and the plurality of passageway outlet 270 may have any shape and size based on application requirements. For example, one or more of the passageway outlets 270 may be circular, elliptical, oval, and so forth.

It should be noted that the leading edge passageway 230, the connecting passageway 250, the trailing edge distribution passageway 240, and the trailing edge passageways 260 may have any suitable cross-sectional shape and dimensions based on application requirements. Further, the leading edge passageway 230, the connecting passageway 250, the trailing edge distribution passageway 240, and the trailing edge passageways 260 may have uniform or non-uniform cross-sectional shape and dimensions. Examples of the cross-sectional shapes may include circular, elliptical, polygonal, oval, irregular, and so forth.

Arrows F1-F10 indicate flow of the fluid 220 through the vane assembly 200 as received by the first leading opening 232 of the leading edge passageway 230. The fluid 220 may first flow through the leading edge passageway 230 from the first leading opening 232 at the radially outer end 206 towards the radially inner end 204 of the aerofoil 202 as indicated by the arrows F1, F2. Since the leading edge passageway 230 is disposed proximal to the leading edge 210 of the aerofoil 202, at least a portion of heat from the fluid 220 may be transferred to the leading edge 210, thereby preventing formation of ice on the leading edge 210 of the aerofoil 202.

The fluid 220 may then be received within the connecting passageway 250 (as indicated by the arrow F3) through the first connecting end 252 since the leading edge passageway 230 is closed at the second leading opening 234 by the first closure plate 236 (shown in FIG. 7) coupled to the inner annulus wall 216 of the vane assembly 200. Further, the fluid 220 may then be received within the trailing edge distribution passageway 240 through the second connecting end 254 of the connecting passageway 250. The second closure plate 246 (shown in FIG. 7) may together cover the first trailing opening 242 of the trailing edge distribution passageway 240 and the second connecting end 254 of the connecting passageway 250 to facilitate flow of the fluid 220 from the connecting passageway 250 to the trailing edge distribution passageway 240 as indicated by the arrow F10 in FIG. 7.

The fluid 220 may then flow through the trailing edge distribution passageway 240 from the radially inner end 204 to the radially outer end 206 of the aerofoil 202 as indicated by the arrows F4, F5. The fluid 220 may then be received within the plurality of trailing edge passageways 260 (as indicated by the arrows F6, F7) since the second trailing opening 244 of the trailing edge passageways 260 is closed by the third closure plate 248 (shown in FIG. 8) coupled to the outer annulus wall 218.

Each of the plurality trailing edge passageways 260 is configured to discharge the fluid 220 through a corresponding passageway outlet 270 from the plurality of passageways outlets 270 as indicated by the arrows F8, F9. Discharge of the fluid 220 through the plurality of passageways outlets 270 that are disposed on the pressure surface 212 of the aerofoil 202 may minimise or eliminate thermodynamic losses that would otherwise have occurred when the fluid 220 is discharged through the suction surface 214 of the aerofoil 202. In some embodiments, the plurality of trailing edge passageways 260 may become narrow immediately before the plurality of passageway outlets 270 as shown in FIG. 6. This may allow metering of the fluid 220 flowing through the plurality of passageway outlets 270 and ensure that all the vane assemblies 200 of the engine section stator may receive adequate flow of the fluid 220 to achieve heating requirements.

It should be understood that the fluid 220 may first flow through the leading edge passageway 230, thereby at least partially heating the leading edge 210 of the aerofoil 202. The fluid 220 may then be received within the trailing edge distribution passageway 240. This may allow substantial heating of the leading edge 210 through the leading edge passageway 230 before the fluid 220 flows through the other passages of the aerofoil 202. Further, flow of the fluid 220 through the plurality of trailing edge passageways 260 may also effectively heat the pressure surface 212 of the aerofoil 202 since the plurality of trailing edge passageways 260 are disposed proximal to the pressure surface 212 before the fluid 220 is discharged through the plurality of passageways outlets 270. In the above configuration of the vane assembly 200, the fluid 220 may first heat the leading edge 210 which may be a critical portion of the aerofoil 202 for ice formation and then the other surfaces of the aerofoil 202 (i.e., the pressure surface 212). Thus, the vane assembly 200 of the present disclosure may distribute heat more effectively to the desired portions of the aerofoil 202. Referring now to FIGS. 4 and 7, in some embodiments, the gearbox 30 may include an oil manifold (not shown) connected to the gearbox 30 through one or more pipes. Oil from the gearbox 30 may circulate to the oil manifold. In some embodiments, the oil manifold may extend out to the vane assembly 200. During operation of the engine 10, the oil of the gearbox 30 may be at an elevated temperature. The oil taking heat away from the gearbox 30 may contact the second closure plate 246 at the inner annulus wall 216 allowing heat from the oil to be transferred into the fluid 220 flowing (as indicated by the arrow F10) from the second connecting end 254 of the connecting passageway 250 to the trailing edge distribution passageway 240. This may ensure that the inner annulus wall 216 remains free of ice and may boost a temperature of the fluid 220 entering within the trailing edge distribution passageways 240 from the connecting passageway 250.

Figure 9:
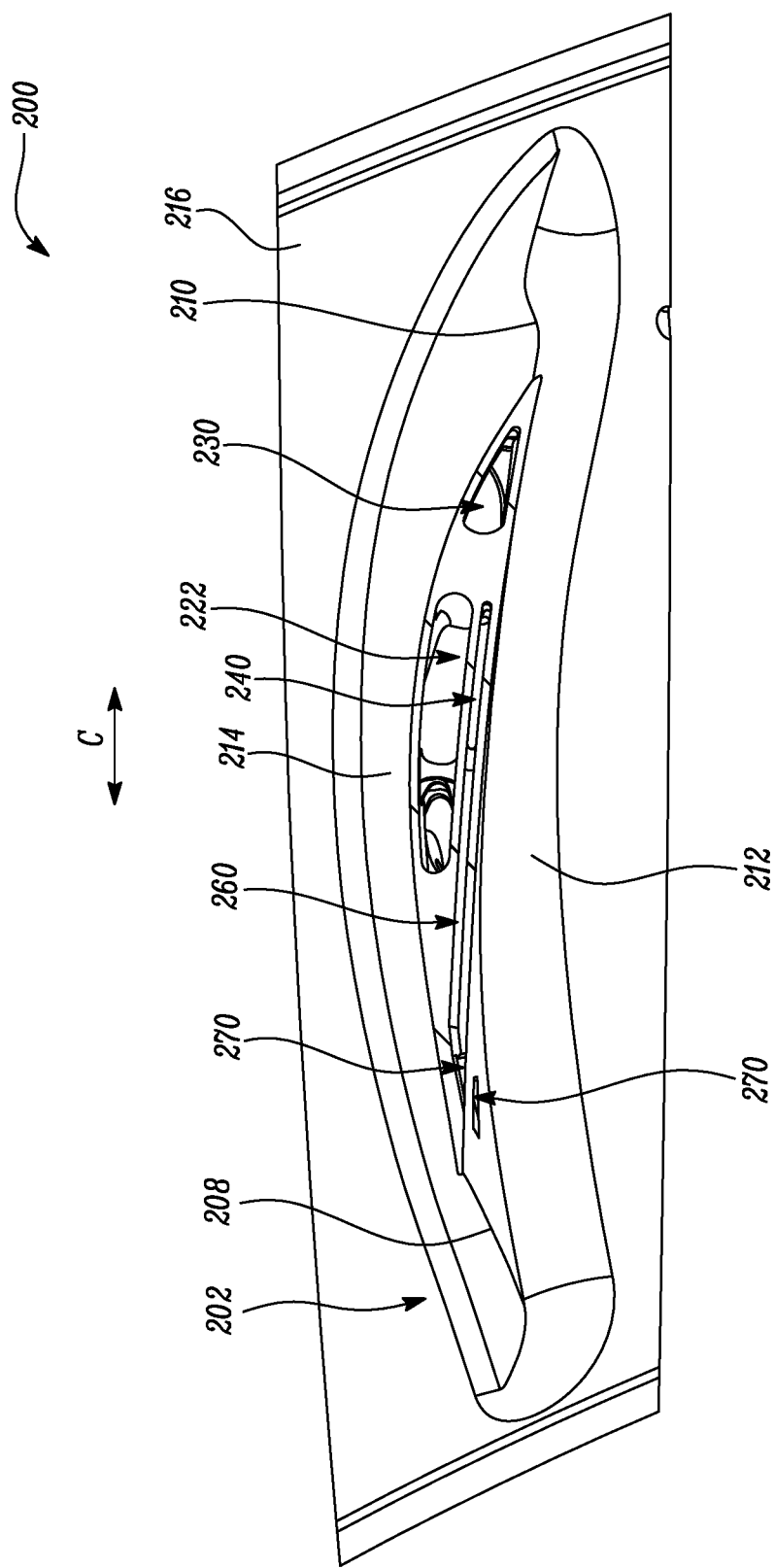
FIG. 9 is a schematic sectional view of the vane assembly taken along a section line P-P' as shown in FIG. 6.

FIG. 9 illustrates a schematic sectional view of the vane assembly 200 taken along a section line P-P' shown in FIG. 6. As shown in FIG. 9, in some embodiments, the hollow cavity 222 may be fluidly isolated from the leading edge passageway 230, the trailing edge distribution passageway 240, the plurality of trailing edge passageways 260, and the connecting passageway 250.

In some embodiments, a shape of each of the plurality of trailing edge passageways 260 is similar to a shape of the pressure surface 212 at a corresponding span (e.g., along the section line P-P') of the aerofoil 202. Thus, the each of the plurality of trailing edge passageways 260 may follow the contours of the pressure surface 210 along the chordwise direction C of the aerofoil 202 at the corresponding span.

In some embodiments, the aerofoil 202 along with the leading edge passageway 230, the connecting passageway 250, the trailing edge distribution passageway 240, the plurality of trailing edge passageways 260, and the plurality of passageways outlets 270 may be integrally manufactured using ALM. This may allow the leading edge passageway 230 and the plurality of trailing edge passageways 260 to be brought closer to the respective edge/surface of the aerofoil 202, i.e., the leading edge 210 and the pressure surface 212, thereby allowing effective heating thereof. ALM may enable manufacturing of complex passages that are closer to the surfaces of the aerofoil 202 and that follow the contours of the surfaces.

The vane assembly 200 of the present disclosure may distribute heat from the fluid 220 to both the leading edge 210 and the pressure side 212, thereby maximising heating potential of the fluid 220, whilst exhausting the fluid 220 through the pressure surface 212 of the aerofoil 202, thereby minimising aerodynamic losses.

Additionally, the leading edge passageway 230 and the plurality of trailing edge passageways 260 may follow the contours of the leading edge 210 and the pressure surface 212, respectively, to increase a heated region of the aerofoil 202 and a residence time of the fluid 220 inside the vane assembly 200. This may allow a given flow-rate of the fluid 220 to heat more surface area of the aerofoil 202 to temperatures above which ice may not accumulate, or alternatively, use less fluid 220 to achieve the same heating effect as a conventional de-icing system. Therefore, the vane assembly 200 of the present disclosure may provide a functional improvement or a fuel saving for the engine 10 (shown in FIGS. 1 and 4).

Figure 10:
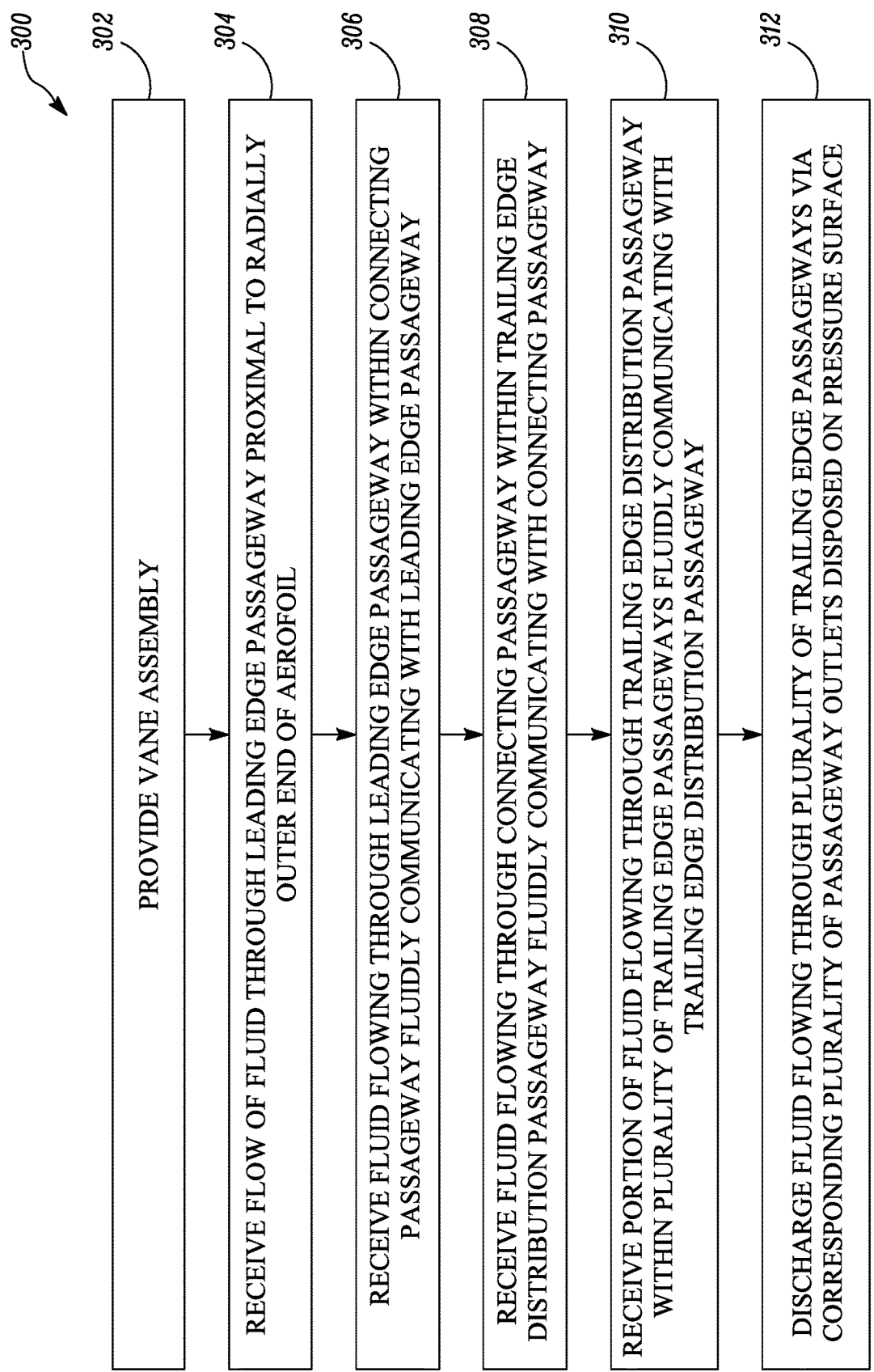
FIG. 10 is a flow chart illustrating a method of de-icing the vane assembly.

FIG. 10 is a flow chart illustrating a method 300 of de-icing a vane assembly 200 of a gas turbine engine. In some embodiments, the vane assembly may be similar to the vane assembly 200 of FIGS. 4-9. At step 302, the method 300 includes providing the vane assembly 200. The vane assembly 200 includes the aerofoil 202 including the radially inner end 204, the radially outer end 206, the leading edge 210, the trailing edge 208, the pressure surface 212 extending between the leading edge 210 and the trailing edge 208, and the suction surface 214 opposing the pressure surface 212 and extending between the leading edge 210 and the trailing edge 208.

At step 304, the method 300 further includes receiving a flow of the fluid 220 through the leading edge passageway 230 proximal to the radially outer end 206 of the aerofoil 202. The leading edge passageway 230 is disposed at least partially within the aerofoil 202 and extending at least along the spanwise direction S of the aerofoil 202.

At step 306, the method 300 further includes receiving the fluid 220 flowing through the leading edge passageway 230 within the connecting passageway 250 fluidly communicating with the leading edge passageway 230 and disposed at least partially within the aerofoil 202 proximal to the radially inner end 204.

At step 308, the method 300 further includes receiving the fluid 220 flowing through the connecting passageway 250 within the trailing edge distribution passageway 240 fluidly communicating with the connecting passageway 250 and disposed at least partially within the aerofoil 202 and extending at least along the spanwise direction S of the aerofoil 202. The trailing edge distribution passageway 240 is spaced apart from the leading edge 210, the leading edge passageway 230 and the trailing edge 208, such that the leading edge passageway 230 is disposed between the leading edge 210 and the trailing edge distribution passageway 240 with respect to the chordwise direction C of the aerofoil 202.

At step 310, the method 300 further includes receiving at least a portion of the fluid 220 flowing through the trailing edge distribution passageway 240 within the plurality of trailing edge passageways 260 fluidly communicating with the trailing edge distribution passageway 240 and disposed within the aerofoil 202. The plurality of trailing edge passageways 260 is spaced apart from each other with respect to the spanwise direction S of the aerofoil 202. Each of the plurality of trailing edge passageways 260 extends from the trailing edge distribution passageway 240 towards the trailing edge 208 at least along the chordwise direction C. Each of the plurality of trailing edge passageways 260 is disposed proximal to the pressure surface 212.

At step 312, the method 300 further includes discharging the fluid 220 flowing through the plurality of trailing edge passageways 260 via the corresponding plurality of passageway outlets 270 disposed on the pressure surface 212 proximal to the trailing edge 208. Each of the plurality of passageway outlets 270 is disposed in fluid communication with the corresponding trailing edge passageway 260 from the plurality of trailing edge passageways 260.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A vane assembly for a gas turbine engine, the vane assembly is a single unitary component comprising:
    an aerofoil comprising a radially inner end, a radially outer end, a leading edge, a trailing edge, a pressure surface extending between the leading edge and the trailing edge, and a suction surface opposing the pressure surface and extending between the leading edge and the trailing edge, the aerofoil defining a spanwise direction between the radially inner end and the radially outer end, the aerofoil further defining a chordwise direction between the leading edge and the trailing edge;
    an inner annulus wall coupled to the radially inner end of the aerofoil and an outer annulus wall coupled to the radially outer end of the aerofoil;
    a leading edge passageway comprising a first leading opening extending through the outer annulus wall and a second leading opening extending through the inner annulus wall, wherein the leading edge passageway extends from the first leading opening to the second leading opening, and wherein the first leading opening is configured to receive a flow of fluid therein proximal to the radially outer end of the aerofoil;
    a trailing edge distribution passageway disposed at least partially within the aerofoil and extending at least along the spanwise direction of the aerofoil, wherein the trailing edge distribution passageway is spaced apart from the leading edge, the leading edge passageway and the trailing edge, such that the leading edge passageway is disposed between the leading edge and the trailing edge distribution passageway with respect to the chordwise direction of the aerofoil;
    a connecting passageway disposed at least partially within the aerofoil proximal to the radially inner end and fluidly communicating the leading edge passageway with the trailing edge distribution passageway;
    a plurality of trailing edge passageways disposed within the aerofoil and spaced apart from each other with respect to the spanwise direction of the aerofoil, wherein each of the plurality of trailing edge passageways is disposed in fluid communication with the trailing edge distribution passageway and extends from the trailing edge distribution passageway towards the trailing edge at least along the chordwise direction, and wherein each of the plurality of trailing edge passageways is disposed proximal to the pressure surface;
    a plurality of passageway outlets disposed on the pressure surface proximal to the trailing edge, wherein each of the plurality of passageway outlets is disposed in fluid communication with a corresponding trailing edge passageway from the plurality of trailing edge passageways, and wherein each of the plurality trailing edge passageways is configured to discharge the fluid through a corresponding passageway outlet from the plurality of passageways outlets; and
    a hollow cavity extending at least in the spanwise direction and fluidly isolated from the leading edge passageway, the trailing edge distribution passageway, the plurality of trailing edge passageways, and the connecting passageway.

2. The vane assembly of claim 1, wherein a spanwise shape of the leading edge passageway along the spanwise direction is similar to a spanwise shape of the leading edge along the spanwise direction.

3. The vane assembly of claim 1, wherein a shape of each of the plurality of trailing edge passageways is similar to a shape of the pressure surface at a corresponding span of the aerofoil.

4. The vane assembly of claim 1, further comprising a first closure plate coupled to the inner annulus wall and closing the second leading opening of the leading edge passageway.

5. The vane assembly of claim 1, wherein the connecting passageway fluidly communicates with the leading edge passageway within the aerofoil proximal to the inner annulus wall.

6. The vane assembly of claim 1, wherein the trailing edge distribution passageway extends from the inner annulus wall to the outer annulus wall via the aerofoil.

7. The vane assembly of claim 6, wherein the trailing edge distribution passageway comprises a first trailing opening extending through the inner annulus wall and a second trailing opening extending through the outer annulus wall, and wherein the trailing edge distribution passageway extends from the first trailing opening to the second trailing opening.

8. The vane assembly of claim 7, further comprising: a second closure plate coupled to the inner annulus wall and closing the first trailing opening of the trailing edge distribution passageway; and a third closure plate coupled to the outer annulus wall and closing the second trailing opening of the trailing edge distribution passageway.

9. The vane assembly of claim 6, wherein the connecting passageway fluidly communicates with the trailing edge distribution passageway within the inner annulus wall.

10. The vane assembly of claim 1, wherein the passageway outlet has a polygonal shape.

11. The vane assembly of claim 1, wherein the vane assembly is integrally manufactured using additive layer manufacturing.

12. The vane assembly of claim 1, wherein the vane assembly is an engine section stator vane.

13. A gas turbine engine including the vane assembly of claim 1.

14. A de-icing system for a gas turbine engine, the de-icing system comprising:
    a source of bleed air; and
    a vane assembly according to claim 1, wherein the leading edge passageway of the vane assembly is disposed in fluid communication with the source of bleed air and configured to receive bleed air from the source of bleed air.

15. A gas turbine engine including the de-icing system of claim 14.

16. A method of de-icing a vane assembly of a gas turbine engine, the method comprising the steps of:
providing a vane assembly, wherein the vane assembly is a single unitary component that comprises an aerofoil comprising a radially inner end, a radially outer end, a leading edge, a trailing edge, a pressure surface extending between the leading edge and the trailing edge, and a suction surface opposing the pressure surface and extending between the leading edge and the trailing edge, an inner annulus wall coupled to the radially inner end of the aerofoil, an outer annulus wall coupled to the radially outer end of the aerofoil and a leading edge passageway comprising a first leading opening extending through the outer annulus wall and a second leading opening extending through the inner annulus wall, wherein the leading edge passageway extends from the first leading opening to the second leading opening;
receiving a flow of a fluid through the first leading opening of the leading edge passageway proximal to the radially outer end of the aerofoil;
receiving the fluid flowing through the leading edge passageway within a connecting passageway fluidly communicating with the leading edge passageway and disposed at least partially within the aerofoil proximal to the radially inner end;
receiving the fluid flowing through the connecting passageway within a trailing edge distribution passageway fluidly communicating with the connecting passageway and disposed at least partially within the aerofoil and extending at least along the spanwise direction of the aerofoil, wherein the trailing edge distribution passageway is spaced apart from the leading edge, the leading edge passageway and the trailing edge, such that the leading edge passageway is disposed between the leading edge and the trailing edge distribution passageway with respect to a chordwise direction of the aerofoil;
receiving at least a portion of the fluid flowing through the trailing edge distribution passageway within a plurality of trailing edge passageways fluidly communicating with the trailing edge distribution passageway and disposed within the aerofoil, wherein the plurality of trailing edge passageways is spaced apart from each other with respect to the spanwise direction of the aerofoil, wherein each of the plurality of trailing edge passageways extends from the trailing edge distribution passageway towards the trailing edge at least along the chordwise direction, and wherein each of the plurality trailing edge passageways is disposed proximal to the pressure surface; and
discharging the fluid flowing through the plurality of trailing edge passageways via a corresponding plurality of passageway outlets disposed on the pressure surface proximal to the trailing edge, wherein each of the plurality of passageway outlets is disposed in fluid communication with a corresponding trailing edge passageway from the plurality of trailing edge passageways.

17. A vane assembly for a gas turbine engine, the vane assembly being a single unitary component comprising:
an aerofoil comprising a radially inner end, a radially outer end, a leading edge, a trailing edge, a pressure surface extending between the leading edge and the trailing edge, and a suction surface opposing the pressure surface and extending between the leading edge and the trailing edge, the aerofoil defining a spanwise direction between the radially inner end and the radially outer end, the aerofoil further defining a chordwise direction between the leading edge and the trailing edge;
an inner annulus wall coupled to the radially inner end of the aerofoil and an outer annulus wall coupled to the radially outer end of the aerofoil;
a leading edge passageway comprising a first leading opening extending through the outer annulus wall and a second leading opening extending through the inner annulus wall, wherein the leading edge passageway extends from the first leading opening to the second leading opening, and wherein the first leading opening is configured to receive a flow of fluid therein proximal to the radially outer end of the aerofoil such that the fluid heats the leading edge; and
a hollow cavity extending at least in the spanwise direction and fluidly isolated from the leading edge passageway.

18. The vane assembly of claim 17, further comprising:
a trailing edge distribution passageway disposed at least partially within the aerofoil and extending at least along the spanwise direction of the aerofoil, wherein the trailing edge distribution passageway is spaced apart from the leading edge, the leading edge passageway and the trailing edge, such that the leading edge passageway is disposed between the leading edge and the trailing edge distribution passageway with respect to the chordwise direction of the aerofoil;
a connecting passageway disposed at least partially within the aerofoil proximal to the radially inner end and fluidly communicating the leading edge passageway with the trailing edge distribution passageway;
a plurality of trailing edge passageways disposed within the aerofoil and spaced apart from each other with respect to the spanwise direction of the aerofoil, wherein each of the plurality of trailing edge passageways is disposed in fluid communication with the trailing edge distribution passageway and extends from the trailing edge distribution passageway towards the trailing edge at least along the chordwise direction, and wherein each of the plurality of trailing edge passageways is disposed proximal to the pressure surface; and
a plurality of passageway outlets disposed on the pressure surface proximal to the trailing edge, wherein each of the plurality of passageway outlets is disposed in fluid communication with a corresponding trailing edge passageway from the plurality of trailing edge passageways, and wherein each of the plurality trailing edge passageways is configured to discharge the fluid through a corresponding passageway outlet from the plurality of passageways outlets.

19. The vane assembly of claim 18, wherein the fluid through the connecting passageway, trailing edge distribution passageway, trailing edge passageways and passageway outlets is configured to heat the aerofoil.

* * * * *